United States Patent
Monnes et al.

(10) Patent No.: US 8,483,701 B2
(45) Date of Patent: Jul. 9, 2013

(54) SYSTEM AND METHOD FOR CONTROLLING CONGESTION IN CELLS WITHIN A CELLULAR COMMUNICATION SYSTEM

(75) Inventors: Peter Monnes, Chelmsford, MA (US); Thomas Andrew Hengeveld, Hollis, NH (US); Melvin Kevin Stubbings, Dallas, TX (US)

(73) Assignee: Pine Valley Investments, Inc., Las Vegas, NV (US)

( * ) Notice: Subject to any disclaimer, the term of this patent is extended or adjusted under 35 U.S.C. 154(b) by 31 days.

(21) Appl. No.: 12/838,106

(22) Filed: Jul. 16, 2010

(65) Prior Publication Data

US 2010/0278042 A1   Nov. 4, 2010

Related U.S. Application Data

(63) Continuation-in-part of application No. 12/431,530, filed on Apr. 28, 2009.

(51) Int. Cl.
H04W 72/00 (2009.01)
H04W 4/00 (2009.01)

(52) U.S. Cl.
USPC ........................................ 455/453; 370/338

(58) Field of Classification Search
USPC ............ 455/432.1, 575.4, 525, 518; 370/230, 370/235, 229, 338
See application file for complete search history.

(56) References Cited

U.S. PATENT DOCUMENTS

| | | | |
|---|---|---|---|
| 5,946,625 | A | 8/1999 | Hassan et al. |
| 6,684,076 | B2 | 1/2004 | McKenna et al. |
| 7,269,657 | B1 | 9/2007 | Alexander et al. |
| 2005/0136943 | A1 | 6/2005 | Banerjee et al. |
| 2005/0246711 | A1 | 11/2005 | Berstis et al. |
| 2005/0278550 | A1 | 12/2005 | Mahone et al. |
| 2006/0112170 | A1 | 5/2006 | Sirkin |
| 2006/0136671 | A1 * | 6/2006 | Balakrishnan et al. ........ 711/122 |
| 2007/0191054 | A1 * | 8/2007 | Das et al. ....................... 455/525 |
| 2007/0202907 | A1 | 8/2007 | Shaffer et al. |
| 2007/0218880 | A1 | 9/2007 | Felter et al. |

(Continued)

FOREIGN PATENT DOCUMENTS

| | | |
|---|---|---|
| GB | 2379359 | 3/2003 |
| GB | 2379359 A | 3/2003 |
| JP | 2008092095 A | 4/2008 |

OTHER PUBLICATIONS

Information about Related Patents and Patent Applications, see section 6 of the accompanying Information Disclosure Statement Letter, which concerns Related Patents and Patent Applications.

(Continued)

Primary Examiner — Michael Faragalla
(74) Attorney, Agent, or Firm — Fox Rothschild, LLP; Robert J. Sacco

(57) ABSTRACT

Systems and methods for controlling congestion in a cellular communication system (20) are provided. A method includes measuring an inter-arrival time for a plurality of communication packets in at least one user equipment within the communication cell and calculating an average value for the measured inter-arrival times (102). The method further includes determining the average value over each of a plurality of time periods and identifying a congestion condition when the determined average value exceeds a predetermined value over the plurality of time periods (104, 106).

21 Claims, 9 Drawing Sheets

U.S. PATENT DOCUMENTS

| | | |
|---|---|---|
| 2008/0056125 A1 | 3/2008 | Kneckt et al. |
| 2008/0240215 A1 | 10/2008 | Nobukiyo et al. |
| 2008/0268864 A1 | 10/2008 | Andersson et al. |
| 2009/0275341 A1 | 11/2009 | Monnes et al. |
| 2009/0275343 A1 | 11/2009 | Monnes et al. |
| 2009/0323528 A1* | 12/2009 | Loiacono et al. ............. 370/235 |

OTHER PUBLICATIONS

International Search Report mailed Aug. 25, 2009, Serial No. PCT/US2009/002689, in the name of M/A COM, Inc.

Japanese Office Action dated Jun. 22, 2012; Application Serial No. 2011-507476 in the name of Harris Corporation.

* cited by examiner

SYSTEM AND METHOD FOR CONTROLLING CONGESTION IN CELLS WITHIN A CELLULAR COMMUNICATION SYSTEM

CROSS REFERENCE TO RELATED APPLICATIONS

This application is a continuation-in-part and claims priority to U.S. patent application Ser. No. 12/431,530 filed on Apr. 28, 2009 entitled "System and Method for Managing Communications in Cells Within a Cellular Communication System", the disclosure which is hereby incorporated by reference in its entirety.

FIELD OF THE INVENTION

This invention relates generally to cellular communication systems, and more particularly, to a system and method for managing congestion within a cellular communication system.

BACKGROUND OF THE INVENTION

Cellular communication systems are generally used to provide voice and data communications between one or more communication units within a cellular communication system. The cellular communication units, for example, cellular telephones, mobile radios or other cellular devices, allow communication between one or more users. Cellular data systems are also known that provide packet data communication capabilities that allow communication of voice and data. For example, the General Packet Radio Service (GPRS) standard can be used to communicate voice or other data in packets over a data channel.

In different cellular communication systems, individual users can be able to communicate with a plurality of other users via a group call or other group connection. For example, the Open Mobile Alliance (OMA) standard allows users with mobile devices to communicate using a push-to-talk function, typically referred to as a push-to-talk over cellular (POC) function, with different groups within a cellular communication system. In such systems, users typically establish personal group lists or "buddy" lists on a cellular telephone. Upon depressing a single button, a user is generally able to establish a connection and communicate with or broadcast a message to multiple users.

The communications between devices corresponding to the personal group lists or "buddy" lists typically include small numbers of users or subscribers. However, if the particular cellular communication coverage area or communication cell in which a group communication is occurring becomes overloaded such that the capacity is exceeded (e.g., bandwidth exceeded), some of the participants in the group call can be unable to connect to the communication link (or some are dropped). Therefore, those members of the group will not be able to participate in the communications and will not be able to listen to the message or obtain the data transmitted over the group connection. However, because this type of personal communication is often not time critical, there are generally minimal or no serious consequences resulting from such loss of connection or inability to connect by some users or subscribers. However, in other types of communication, such as emergency group calls, loss of connection or inability to connect to a call can have serious (sometimes life threatening) consequences.

In general, user equipment and other equipment external to the cellular core network also is typically unable to detect the amount of activity in a particular cell or determine an amount of usage relative to a maximum number of users, a maximum capacity, or otherwise. Accordingly, the cellular communication system or network will typically not provide any type of notification or alert when the system is reaching or about to reach a maximum level or capacity. Consequently, additional units attempting to establish a communication link using an overloaded cell, such as to join a group call, can not be able to join and additionally there will be no prior indication that such denial of access is about to occur. Moreover, there is generally no means to prevent such a denial of service from occurring. Thus, because there is no indication from the network of when a particular cell is reaching a maximum level or capacity, there typically is no way to control or otherwise reduce the likelihood that individuals or units attempting to connect with a particular uplink or downlink will not be able to access that uplink or downlink connection to join a group call.

SUMMARY

In accordance with an embodiment of the invention, a method for detecting a congestion condition in a communication cell of a communication system is provided. The method includes measuring an inter-arrival time for a plurality of communication packets in at least one user equipment within the communication cell and calculating an average value for the measured inter-arrival times. The method further includes determining the average value over each of a plurality of time periods and identifying a congestion condition when the determined average value exceeds a predetermined value over the plurality of time periods.

In accordance with another embodiment of the invention, a method for controlling congestion within a communication cell of a communication system is provided. The method includes requesting a plurality of user equipment within the communication cell to monitor congestion and receiving from the plurality of user equipment a report of a congestion condition when measured inter-arrival times for communication packets received by the user equipment for a predetermined number of the communication packets over a predetermined time period has exceeded a threshold value. The method further includes controlling congestion with the communication cell based on a received number of congestion reports.

In accordance with yet another embodiment of the invention, a wireless communication system is provided that includes a plurality of communication cells. The wireless communication system further includes a plurality of voice servers. Each of the plurality of communication cells is assigned to one of the plurality of voice servers and at least one of the plurality of voice servers is configured to control congestion within at least one communication cell based on congestion reports received from a plurality of user equipment within the at least one communication cell. The congestion reports indicate a congestion condition based on a measured inter-arrival time for communication packets received by the user equipment.

DETAILED DESCRIPTION

Figure 1:
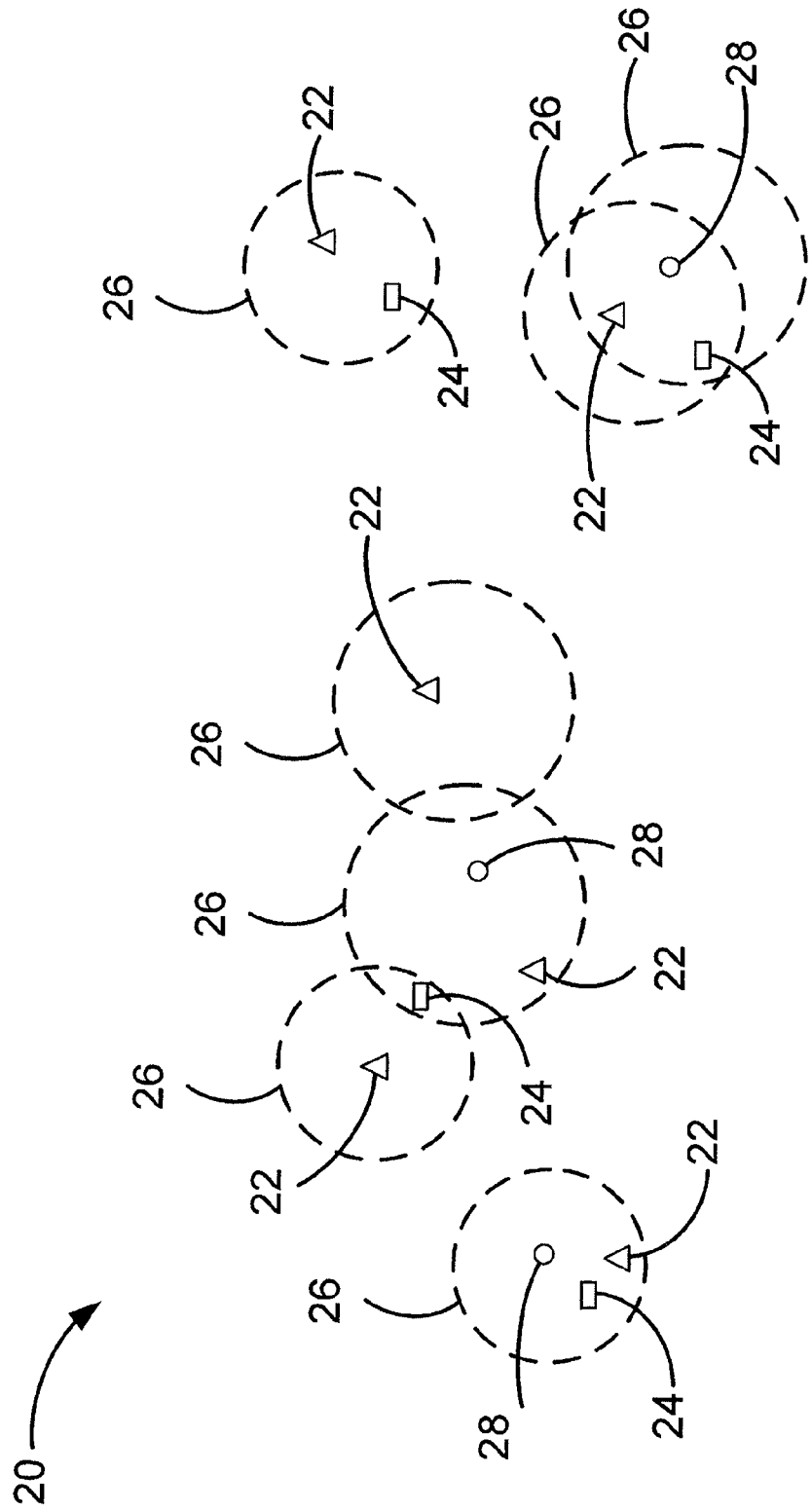
FIG. 1 is a block diagram of a cellular communication system in which cell congestion can be controlled in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between system components or hardware circuitry. Thus, for example, one or more of the functional blocks (e.g., processors or memories) can be implemented in a single piece of hardware (e.g., a general purpose signal processor or random access memory, hard disk, or the like). Similarly, the programs can be stand alone programs, can be incorporated as subroutines in an operating system, can be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property can include additional such elements not having that property.

The various embodiments of the present invention provide systems and methods for managing communication traffic within communication cells of a communication system, and in particular, controlling congestion within the communication cells. For example, the various embodiments provide for managing multiple cellular connections by detecting congestion conditions, and more particularly, managing cellular data connections (or call legs) within a cellular communication system. This is conceptually illustrated with respect to FIGS. 1 and 2.

Figure 2:
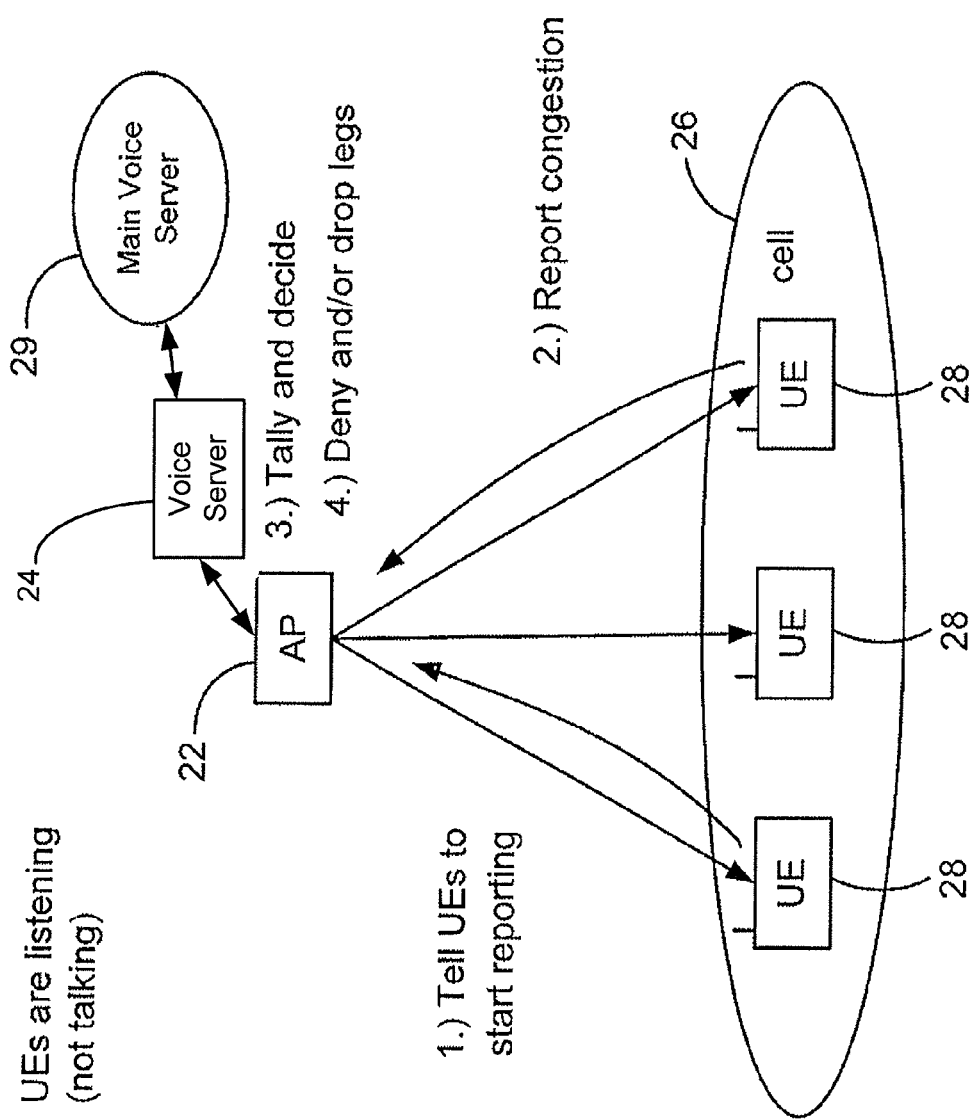
FIG. 2 a block diagram illustrating communication cell capacity management in accordance with various embodiments of the invention.

FIG. 1 is a block diagram of a cellular communication system 20 in which cell congestion can be controlled in accordance with various embodiments of the invention. FIG. 2 a block diagram illustrating communication cell capacity management in accordance with various embodiments of the invention.

As shown in FIG. 1, the cellular communication system 20 includes a plurality of access points (APs) 22 (shown as triangles in FIG. 1), which can comprise cellular network base stations. The cellular communication system 20 also includes and a plurality of voice servers 24 (shown as rectangles in FIG. 1). The APs 22 can be any type of access points in the various embodiments of the invention. For example, in some embodiments of the invention the APs 22 can be access points for public safety, public radio or group communications. However, the various embodiments of the invention are not limited to systems providing land-based communications For example, in other embodiments of the invention, the APs 22 can be part of communication systems providing sea-based or air-based communications.

As shown in FIG. 2, the voice servers 24 can be controlled by a main voice server 29 (e.g., a switch), such as a Voice Network Interface Controller (VNIC) server. Also, the voice servers 24 are shown to indicate that the voice servers 24 can be associated at different times with different cells and in one embodiment the voice servers 24 are physically located a central data center (not shown). Furthermore, as shown in FIGS. 1 and 2, each of the plurality of APs 22 has a corresponding cellular data network communication coverage area 26 (also referred to as a communication cell or cell). The cellular data network communication coverage areas 26 can be overlapping at some locations.

The various embodiments of the invention as described herein allow one or more communication units, for example, user equipment (UE) 28 or other portable communication device to communicate with other UEs 28 via broadcast or group messaging. For example, the UEs 28 can be land mobile radios configured to communicate over the cellular communication system 20 by transmitting and receiving cellular data communication packets using voice over cellular (VOC). More particularly, various embodiments of the invention detect activity in a communication cell and determine when a maximum level or capacity is close to being reached or predict when that maximum level or capacity will be reached based on congestion reports received from the UEs 28. The current conditions (e.g., inter-packet arrival times) can be measured to estimate, for example, communication congestion within a communication cell and determine when or if the communication cell is or can become overloaded. Accordingly, based upon this estimation and/or a determination of particular users communication activity, which can include present activity information (e.g., active call(s) information), as well as historical information, management of different communication links within the cellular communication system 20 is provided.

It should be noted that the various embodiments of the invention are not limited to managing communications and controlling congestion with a cellular communication system, but can be implemented in connection with different communication networks or systems wherein, for example, current bandwidth usage is not available and an estimation of the usage is desired or needed. For example, communication congestion can be controlled in a WiFi communication system. Also, communication management and congestion control can be implemented in connection with different cellular networks, for example, an Enhanced Data Rates for GSM Evolution (EDGE) network, Code Division Multiple Access (CDMA) network, Universal Mobile Telecommunications System (UMTS) network or a W-CDMA (Wideband Code Division Multiple Access) network.

Because typical cellular communication systems, for example, Global System for Mobile Communications (GSM) systems, have no broadcast capability, group communications will often heavily load the communication cells within the system network. Accordingly, priority communications can not be able to be accessed due to the congestion. Moreover, all communications can suffer poor quality of service during the congestion. As such, cell congestion is detected and the likelihood of a negative impact on a UE 28, for example, of the UE 28 being dropped from a group call or not being able to connect to a group call, is reduced or eliminated by taking an action to reduce or lower the cell congestion level.

In particular, as shown in FIG. 2, various embodiments of the invention monitor a congestion level of a communication coverage area 26 (e.g., a cell) using or through the APs 22. The general process for monitoring and controlling the congestion level in the communication coverage area 26 can be provided as follows:

1. The voice server 24 requests UEs 28 to begin reporting communication connections within the cell.

2. The UEs 28 report communication congestion levels to voice server 24 via the AP 22.

3. The voice server 24 determines, based on a tally or count of the number of congestion reports from UEs 28, whether action is to be taken based on a overall congestion level determined from the UE congestion reports.

4. If the overall congestion level exceeds a predetermined level or criteria, call legs (connections or links) are denied and/or dropped (terminated) by the voice server 24.

It should be noted that the reporting from the UEs 28 can be initiated and provided using any suitable means. For example, a monitor bit can be provided in a packet header of packets communicated to the UEs 28 from the voice server 24 that enables the reporting functionality of the various embodiments. Accordingly, using the monitor bit, a congestion report message thereafter can be provided to the voice server 24 from the UEs 28. The messaging and procedures for the reporting can be modified based on the type of communication, communication system requirements, etc. For example, when a predetermined number of UEs 28 (e.g., 5 UEs) are listening within a cell, the capacity management and cell congestion control procedures of the various embodiments are initiated. Thereafter, the monitor bit is set on all subsequent voice packets from the voice server 24 to indicate to the UEs 28 that the UEs 28 need to begin sending congestion reports to the voice server 24. It should be noted that the voice server 24 also identifies which packet sequence number started the monitoring process. Additionally, it should be noted that when the number of UEs 28 falls below the predetermined level, the voice server 24 can cancel the monitor bit to indicate to the UEs 28 to stop reporting congestion. In the various embodiments of the invention, UEs 28 are communicatively coupled to voice server 24 via AP 22. Accordingly, one of ordinary skill in the art will recognize that any packets exchanged between UEs 28 and voice server 24 will be transported by AP 22. In some embodiments of the invention, the voice server 24 and AP 22 may be combined in to a single component.

Figure 3:
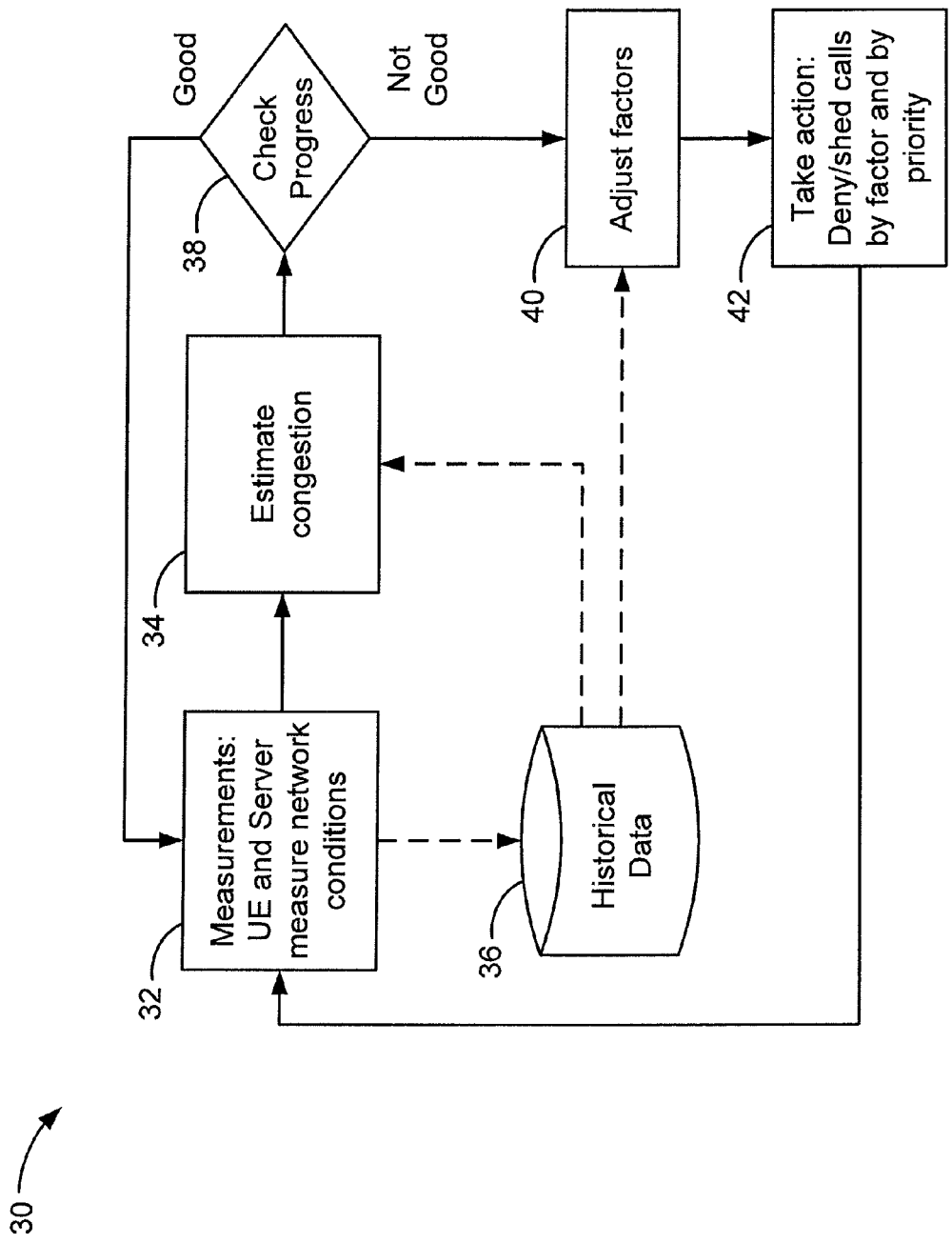
FIG. 3 is a flowchart of a method for providing capacity management in accordance with various embodiments of the invention.

In the various embodiments of the invention, monitoring a congestion level of a communication coverage area (e.g., a cell) can be provided by the method illustrated in FIG. 3. FIG. 3 is a flowchart of a method 30 for providing capacity management for wireless communications in accordance with various embodiments of the invention. For example, the method 30 provides a process for capacity management for cellular communications within the cellular communication system 20.

Specifically, the method 30 determines or makes measurements of user and network conditions at 32, such as based on congestion reporting from the UEs 28. For example, measurements are obtained from the UEs 28 or from one or more servers having information stored regarding current use/activity or historical use/activity. In some embodiments of the invention, the UEs 28 can log statistical information such as failed or delayed connection attempts, times for such failure or delay, reason for the failure or delay, location ports/cell 10 corresponding to the failure or delay, signal strength, duration of communications, time between communications, inter-arrival times of packets, etc. The UEs 28 then can send a log to voice server 24. The log can be sent periodically, for example, at different points in time, such as at some configurable time of day or a configurable time after failure (to avoid congestion). However, other transmission times are contemplated, for example, the log can be sent on demand (e.g., based on a request initiated by the monitor bit or self-initiated by the UE 28) or as soon as possible after a particular logged event. It should be noted that when reference is made herein to UEs 28, this refers to any type of device capable of communicating within, for example, the cellular communication system 20, such as a cellular telephone, a handset, a radio, a terminal, etc.

Referring again to FIG. 2, at 32 the server can also measure different network conditions. For example, the server can measure jitter across heartbeat signals (e.g., data pulses to maintain data link connection) of all the UEs 28 or jitter across all current call legs (e.g., current call connections). As used herein, the term "call leg" refers to any communications link between a UE 28 and a server, for example, the voice server 24 (as shown in FIGS. 1 and 2). Additional or optional measurements also can be obtained by the network, for example, access time per call set-up and the number of registered users within the cell. However, it should be understood that the measurements obtained by the UEs 28 and by the server can be of any type as desired or needed. Additionally, the measurements can be obtained based upon a network type. For example, different measures can be made if the system is an EDGE network versus a UMTS network. Additionally, measurements can be made at different time intervals, which can be anywhere from sub-minute frequency to sub-second frequency. Also, different types of measurements can be made, such as variance in arrival rate (inter-arrival rate) as described in more detail herein. For example, the variance in arrival rate can be determined by measuring the time between the arrival of each of a plurality of data packets at one or more of the UEs 28.

In some embodiments, if there are no communications within a particular communications cell for a particular time period (e.g., several seconds), the system can ping the UEs 28 within a particular communications cell to determine a success rate of communication. For example, a group ping can be provided to all UEs 28 within a particular communication coverage area 26 defining one or more communication cells. During pinging of the UEs 28, dummy packets are generated to measure the network reaction in the absence of current network traffic. In such embodiments, this pinging allows a judgment about congestion to be made when there are an insufficient number of UEs with call legs to get a sufficient amount of sample data.

After making the measurements at 32, the congestion within one or more communication cells within the cellular communication system 20 is estimated at 34. This estimation can include, for example, calculating the maximum number of call legs (e.g., call connections) within a particular communication cell, which can include maintaining a log of the highest number of observed call legs per communication cell. Moreover, and for example, if a plurality of users are in a particular communication cell, the ping message (as described above) or other pulse can be communicated, which can be referred herein as a test pulse, to measure the potential maximum call legs currently within a particular communication cell.

It should be noted that as part of the estimation, historical data that is determined and stored at 36, which can be based in part on the measurements at 32, can be used as part of the estimation. Thus, the estimation at 34 includes not only the current activity, but also uses historical data to predict, for example, behavior for particular users. The estimation can determine that based on a user's activity, which can be developed into a user's activity profile, the user is likely to establish a call or communication link within a certain time period range (e.g., within the next 3 minutes to 5 minutes, or within the next 5 minute to 15 minutes, etc.). The user's profile can also be accessed to determine what type of call can be likely, for example, whether the call is likely to be to a single other user or multiple users (e.g., a group call) and the priority level for that call, as well as the number of calls the user has made recently or historically. These predications or estimations can be made using any known predictive or estimation methods, including, for example, simulations (e.g., Monte Carlo simulations), tests, etc.

As part of the estimation of congestion at 34, a historical correlation between measured performance and congestion can be determined. For example, a historical correlation between measured heartbeat jitter, call spread jitter, access time, inter-arrival time of packets, etc. can be correlated with congestion including failed attempts logged by the UEs 28, etc. Based upon the current activity and stored historical data, the estimated congestion can predict a particular congestion level, for example, a congestion severity level for the particular communication cell given different factors including congestion versus performance history, a maximum number of call legs, a number of units currently in the cell, each user's historical behavior, time of day, etc. as described above. For example, different severity levels can result in different factors being adjusted and actions taken (e.g., remedial actions) as described below.

After the congestion estimation at 34, a determination is made at 38 as to whether the current communication cell and any actions previously taken by the system have improved the conditions within the communication cell. For example, a determination can be made as to the progress of any actions that can have been taken within the communication cell based upon the estimated congestion at 34 and the level of congestion severity. If a determination is made at 38 that the communications and congestion within the communication cell are at an acceptable level or a good level (e.g., at a predetermined level below an overload condition), then the system again continues to obtain measurements at 32 and monitor the system.

However, if at 38 it is determined that the communications within the cell are continuing to deteriorate or become more congested, then factors describing a level or amount of corrective action or adjustment needed are adjusted at 40. In the various embodiments of the invention, the level or amount of corrective action needed to reduce congestion can be adjusted based on the results of previous actions taken. For example, if the system determines that the current congestion level determined at 34 (or other conditions) is similar to a previously determined congestion level at 34 (or other conditions), the system can determine whether the same or different action should be taken. For example, the level of congestion can be separated into different levels of severity, such as a green level, yellow level, orange level and red level, which are in increasing order of severity of congestion. If a previous action taken during an orange level condition resulted in the congestion staying at the orange level or increasing to the red level, then additional actions can be taken (e.g., additional actions to reduce bandwidth congestion) because not enough action was previously taken. However, if a previous action taken during an orange level condition resulted in the congestion reducing to the green level, then less action can be taken (e.g., less action to reduce bandwidth congestion) because too much action was previously taken. Thus, by assessing different previous actions that were taken by the system a factor describing the amount or level of needed action can be adjusted at 40.

Accordingly, based upon the determined level of action taken to address the congestion, an adjustment can be made if the congestion level persists or if the congestion level disappears too quickly, indicating that not enough action was previously taken or too much action was previously taken, respectively. Moreover, different levels of adjustment can be provided, for example, if a determination is made that in general the actions taken are not enough to reduce the congestion or if there are localized problems at a particular communication cell level.

Based on the adjusted factors at 40, particular actions are taken at 42 to provide the level or amount of action needed to reduce congestion. For example, in one embodiment of the invention, different actions can be taken based upon the severity level of the congestion. A table or other matrix can be used that indexes the different actions into an action table, which can list in order of severity the service to impact and the type of impact that is to be taken based upon the adjustments determined at 40. For example, the type of impact can include degrading service quality to the overall system, degrading service quality to a particular UE 28, denying access to a new UE 28, interrupting service to one or more UEs 28, etc. Therefore, an action table can be created based upon different levels of congestion within a system. For example, Table 1 show an exemplary action table. In Table 1, a green level is for a communication cell that is not congested, a yellow level is for a communication cell that is starting to become congested, an orange level is for a communication cell that is becoming even more congested, and a red level is for a communication cell that has reached or exceeded its maximum capacity.

TABLE 1

Exemplary Action Table

| Current Estimated Congestion Level | Action To Be Taken |
|---|---|
| Green Level | No action. |
| Yellow Level | Deny new low priority connections |
| Orange Level | Deny new medium and low priority connections and drop low priority connections. |
| Red Level | Deny any new connections except priority connections and drop medium and low connections. |

In the various embodiments of the invention, the actions taken, and in particular, which call legs to drop (or which new call legs to deny) can also be based upon the priority of the call, such as whether it is an emergency call, and also that the particular UE 28 making the broadcast or group call. For example, a priority list can be defined as follows:
1. All call,
2. Emergency on PI,
3. Emergency on P2,
4. Emergency on Select,
5. Emergency on P3,
6. Announcement,
7. icall,
8. PI,
9. P2,
10. Select,
11. P3,
12. Data call, and
13. PSTN.

However, the invention is not limited to the priority list shown above and any type and arrangement of calls can be used to define a priority list in the various embodiments of the invention. It also should be noted that similar actions can be taken to add legs to a cell. For example, if there is an extended period of no congestion, the voice server 24 can add new legs at a faster pace.

In the various embodiments of the invention, a set of criteria is used to determine which UEs 28, calls or call legs to drop. In some embodiments of the invention, UEs 28 with the lowest priority are first dropped. Some examples of prioritization include the type of UE 28 (e.g., emergency LMR versus personal radio), the type of call (e.g., emergency versus non-emergency calls), the class of user (e.g., supervisory versus non-supervisory user) and priority of the enterprise (e.g., some enterprises can pay a premium to increase their priority). Different call conditions also can affect whether a UE 28 is dropped. For example, if the signal strength for a UE 28 is below a predetermined level (e.g., below a predetermined signal strength) then the priority of the UE 28 in the priority list can be lowered a predetermined number of levels (e.g., 5 levels). After the least priority UEs 28 are dropped, then legs on a lower priority group and lower priority users are dropped. Thereafter, other conditions relating to the call leg can be used to determine which legs to drop. For example, thereafter the call with the longest duration can be dropped followed by the UEs 28 that are newest to the cell.

If two or more call legs are on the same call and have the same priority, the call leg that has received the most number of communication packets during the current call is dropped first in some embodiments. The call leg that has received the most number of communication packets typically has the least number of communication packets still queued in the network.

Thus, when congestion is detected on a downlink, one or more call legs can be dropped. For example, if half the UEs 28 report congestion and there are more than a predetermined number of UEs 28 (e.g., 10 UEs 28), then a predetermined percentage (e.g., 10 percent) or predetermined number of legs (e.g., 1 leg) are dropped as described in more detail herein, such as based on the priority of calls. It should be noted that different actions can be taken based on the level of congestion. For example, if a predetermined number of UEs 28 (e.g., more than half the UEs 28 in a cell) are reporting severe congestion, a higher predetermined percentage (e.g., 20 percent) or higher predetermined number of legs (e.g., 2 legs) are dropped. Additionally, requests for new call legs from new UEs 28 (e.g., emergency, late join, new call, etc.) can be added and other call legs dropped based on a level of priority of the call leg, such as an emergency call leg.

Additional information can also be used to provide capacity management. For example, information from adjacent or adjoining communication cells within the communication system can be used. For example, in some communication systems signal strength of neighboring communication cells can be used to determine whether or not to move a particular call to another cell. However, it should be noted that in some systems, for example, GSM, it is presently not possible to move a call to another cell as described above. Thus, in systems that allow movement of a call to another cell, the system can drop a connection (call leg) to a UE 28 and re-connect into a communication cell that has less congestion, but with adequate or acceptable signal strength.

It further should be noted that during times of high congestion, for example, when a determination is made that the system is at a level that is near maximum capacity and adjustment factors are to be taken (e.g., the orange or red level), the actions taken can result in some or all group members not being able to obtain a connection to a group call that is in progress. In such circumstances, where action is to be taken to deny or drop calls, and some of the users will be unable to connect to the call, or are dropped from the call, the users can at a later point in time optionally receive a recording of the call. This is described below with respect to FIG. 4.

Figure 4:
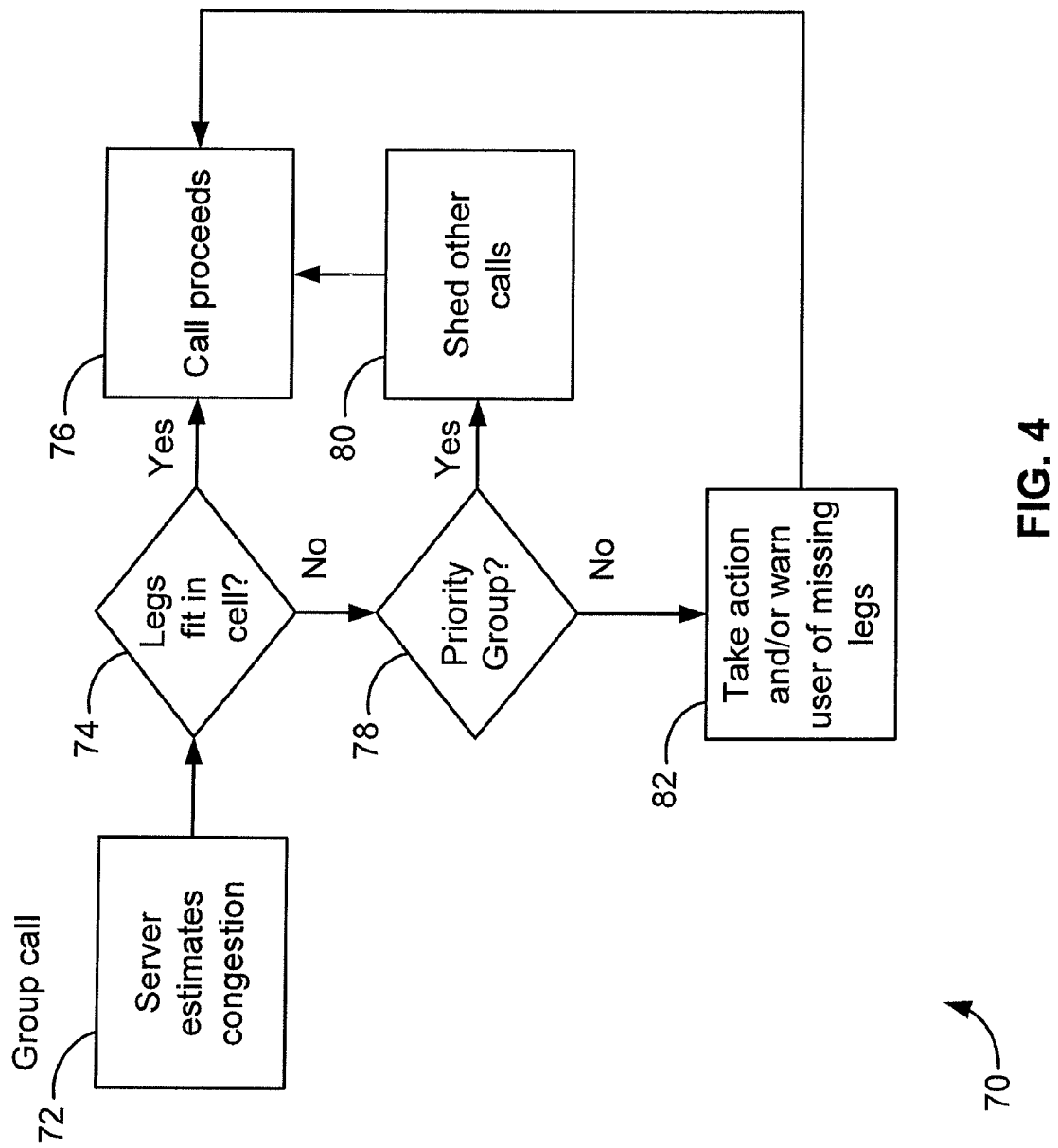
FIG. 4 is a flowchart of a method for managing a congested cell in accordance with various embodiments of the invention.

FIG. 4 is a flowchart of a method 70 for managing a congested cell in accordance with various embodiments of the invention. As shown in FIG. 4, a method 70 for managing a congested cell includes the step of a server, such as the voice server 24 (shown in FIG. 1), estimating congestion of a communication cell at 72. The server can estimate a current congestion level based on a particular group call to determine what action should be taken. Afterwards, a determination is made at 74 by server as to whether the current number of legs (e.g., communication links based on the number of active devices participating in the call) fit within the communication cell. For example, whether the available bandwidth or capacity is sufficient to maintain the communication cell at an acceptable congestion level. If a determination is made at 74 that the current number of legs or an anticipated number of legs will fit within the communication cell, for example, the number of communication links will not exceed the maximum capacity of the communication cell and a congestion level is not exceeded, then the group call proceeds at 76.

However, if a determination is made at 74 that the number of legs do not or will not fit in the cell (for example, based on a plurality of UEs 28 reporting congestion), then a determination is made at 78 by server as to whether the group is a priority group. For example, a determination can be made as to whether the communications for the particular group is a priority communications, such as an emergency call. However, the various embodiments are not limited to emergency calls. Rather, the various embodiments of the invention can be used to manage any other types of communications that might be time sensitive or time critical or that otherwise can result in injury or other adverse consequences if not timely connected.

For example, when a crane operator is making a group call to others within the work area to identify when and where the crane will be moved, this type of information can be deemed as priority information and thus a priority call to a priority group. Other priority calls can be made between emergency personnel such as the police or fire department during a particular time. If a determination is made at 78 that the group is a priority group or the call is a priority call, then at 80 some or all other calls within the communication cell are dropped or otherwise transferred to other communication cells. As described herein, the dropped users can receive notification of the drop and/or a subsequent recorded message of the content missed after the drop. Thereafter the call proceeds at 76.

In some embodiments of the invention, the communication can be delayed instead of dropped. For example, if a priority level of a call specifies that timely, but not instantaneous, delivery is required, the call can be delayed by system until congestion is reduced or until only lower priority calls are being placed.

If a determination is made at 78 that the group is not a priority group, then at 82 one or more actions are performed to reduce the congestion other than dropping or terminating call legs. For example, particular calls can be delayed or transmitted at lower rates, thereby degrading the call quality of some of the call legs. Users also can be warned at 82 that some legs are missing, such that certain users are not able to connect with the call. For example, these users on the missing legs can not be allowed to connect.

In the various embodiments of the invention, the different functions and operations can be divided between different portions of the system or can be dedicated to certain portions. For example, the voice server enables monitoring using a monitor bit and detects congestion in response to a request to the UEs 28. The voice server 24 then takes actions (e.g., deny or drop legs) and subsequently can take further action (e.g., add back legs) to maintain cell congestion below a predetermined maximum where communications are affected (e.g., call quality lowered or delayed).

Procedures for the UEs 28, such as reporting procedures can be defined in different ways. Moreover, different information can be reported from the UEs 28 at different times. For example, a UE 28 can report to the voice server 24 if a running average across a plurality of packets, such as 16 packets, which can typically arrive at about 60 millisecond (ms) intervals, stays above a predetermined interval (e.g., 65 ms) for a consecutive number of measurements (e.g., 7 consecutive measurements). Thereafter, this same determination can be made after a predetermined time period (e.g., 5 seconds). It should be noted that the UEs 28 can always be monitoring communications and report to the voice server 24 when the voice server 24 sets the monitor bit.

As an example, the UEs 28 can report a congestion condition based on a running average of inter-arrival time for packets (which essentially defines the delay between arrived packets) from a moving window. It should be noted that the windows can overlap, for example, by one packet. In particular, the window can be defined as 16 samples of the inter-arrival time and a predetermined threshold is monitored, such as, if the inter-arrival time exceeds 65 ms. It should be noted that the threshold can be changed, such as based on system conditions. During high traffic level times the threshold value can be increased, such as to 75 ms. Following this example, the running average is calculated as follows:

$$newAve = ((windowSize-1)*oldAve + newSample)/windowSize$$

where, windowSize in the sample size of the window, oldAve is the old running average and newSample is the current sampled inter-arrival time for a packet.

It should be noted that using the above running average calculation newer samples have a higher weight than older samples. Additionally, a multiplier can be used to further weight the samples.

In the various embodiments of the invention, a congestion condition is determined based on whether a threshold is exceeded on a consecutive number of windows, namely the moving windows. For example, if the threshold is exceeded on 7 consecutive windows, then a congestion condition is determined to be present and is reported. It should be noted that the inter-arrival time for packets can be calculated in any manner. In some embodiments, the inter-arrival time, accounting for uplink delays, is calculated for every packet as follows: the time since the packet was received+(60-inter-arrival time on the uplink). In such embodiments the voice server can provide the uplink delay measure for the UE to remove the uplink delay from the downlink calculations. It should also be noted that high peaks in the inter-arrival time can be due to factors other than congestion, for example, network retransmissions due to power management. Accordingly, in the various embodiments of the invention, if the inter-arrival rate exceeds a high threshold, such as 500 ms then windows above the threshold are not counted again until after a predetermined time period (e.g., length of delay/2) is reached. However, if a predetermined number of samples (e.g., 5 samples) are above the high threshold for a predetermined period of time (e.g., 5 seconds), indicating a likely severe congestion, then the counting of windows above the threshold as described above continues.

Figure 5:
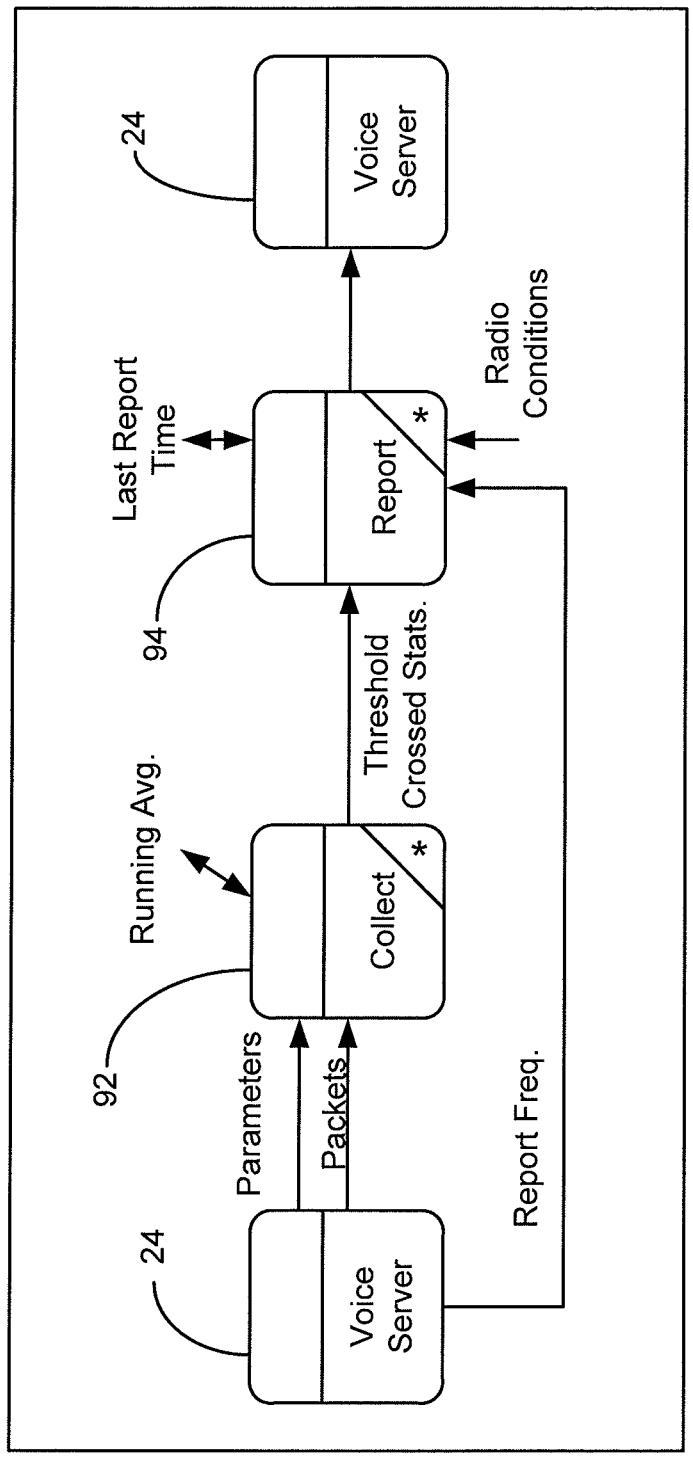
FIG. 5 is block diagram illustrating a user equipment reporting process for providing control of cell congestion in accordance with various embodiments of the invention.

In some embodiments, a UE reporting process is provided as shown in FIG. 5. FIG. 5 is block diagram illustrating a UE reporting process 90 for providing control of cell congestion in accordance with various embodiments of the invention. As shown in FIG. 5, a UE collection component 92 as part of the UEs 28 monitors packet arrival times and determines when a congestion threshold is reached or exceeded. Upon entering a cell, the UE collection component 92 receives parameters for the following:

EM=Enable Capacity Management wherein the capacity management is passed to the UE 28 in a mobility message.

AL=Capacity Management Algorithm to use, for example a "consecutive running average windows" process as described herein.

WS=The size of the window (in number of packets) of incoming packets that should be monitored. For example, a default size of the window can be 16 packets.

CT=Consecutive number of packets for which the running average must be greater than the inter-packet arrival threshold (IT) in order to identify a congestion condition.

IT=Threshold of average packet inter-arrivals in milliseconds, above which congestion is identified.

RS=Report Spacing (milliseconds), which is the minimum interval allowable between reports from the UE.

The collection component 92 uses the inter-arrival time of packets as the packets arrive and the first WS packets' inter-arrival times are summed. Accordingly, initially the RA (Running Average)=(time to receive the first WS samples)/WS. After WS packets are received, the running average (RA) is calculated as follows: RA=(RA*(WS-1)+new packet inter-arrival time)/WS. If RA>IT for CT, then notification is provided to the reporting component 94.

It should be noted that the collection component 92 monitors packets and calculates the RA even if monitoring is not required by the voice server 24. If the voice server 24 requests reporting by setting the monitor bit, a running average often already is started and congestion can thereafter be monitored. It also should be noted that when reference is made herein to a component, this can refer to a software component, a hardware component or a combination thereof.

The reporting component 94 determines when to report a perceived congestion problem. For example, the reporting component 94 determines when a maximum level or capacity is close to being reached or predicts when the maximum level or capacity will be reached. In operation, upon entering a cell, the reporting component 94 receives, among other parameters, the Report Spacing (RS) parameter from the voice server 24 indicating the minimum allowable time between reports. Accordingly, the reporting component 94 receives "threshold crossed" reports from the collection component 92, determines the last time that a report was issued and if the last report was issued more than RS milliseconds ago, then the reporting component 94 sends a report to the voice server 24. The congestion report contains the RA observed at the last packet received and the packet sequence number of the last packet received.

Figure 6:
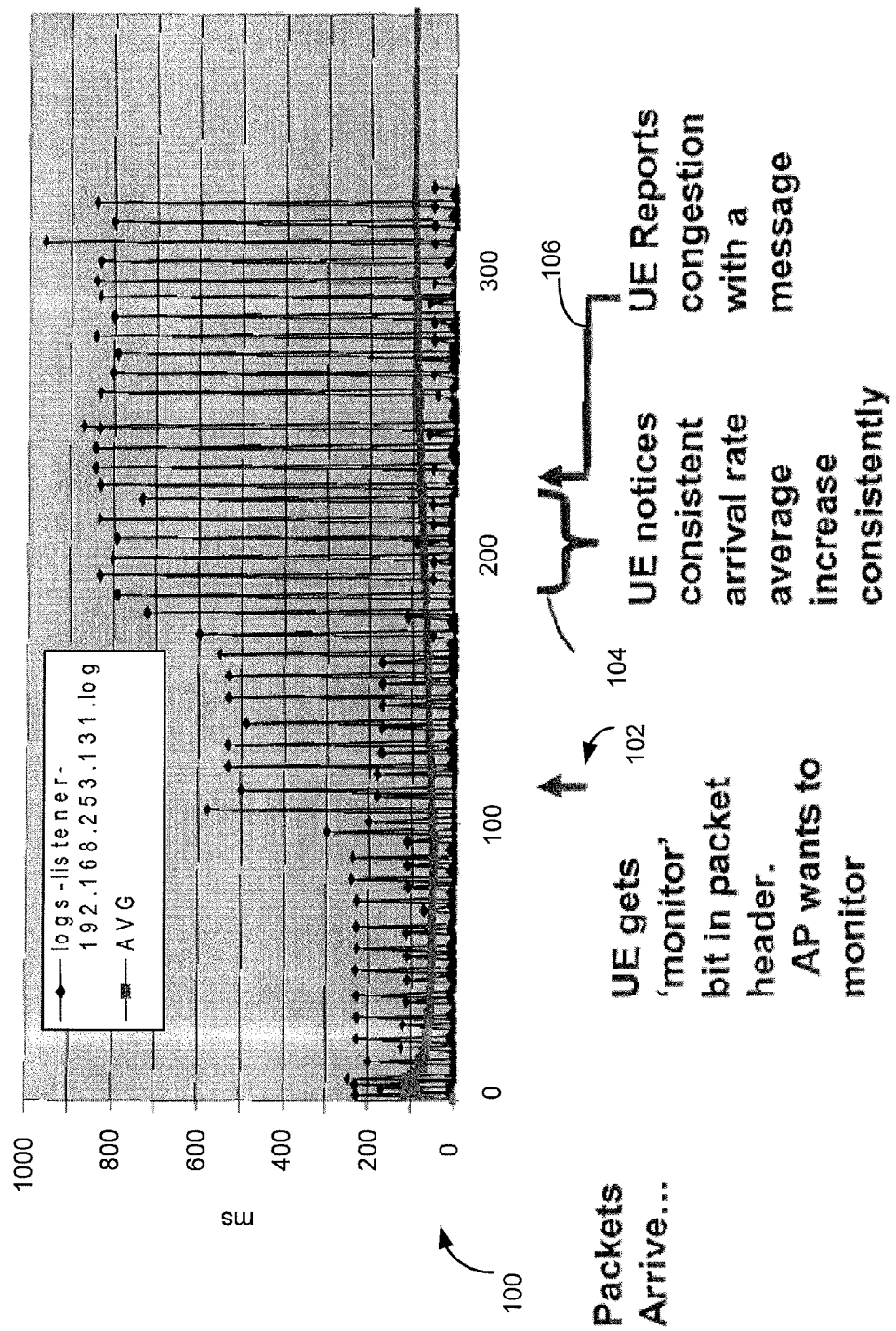
FIG. 6 is a graph illustrating tracking of inter-arrival rates of packets by user equipment in accordance with various embodiments of the invention.

A tally or count of inter-arrival times (or rates) can be maintained within the UEs 28 for use in identifying a congestion condition based on predetermined criteria and/or thresholds. This is illustrated with respect to FIG. 6. FIG. 6 is an exemplary graph 100 illustrating tracking of inter-arrival rates of packets by user equipment in accordance with various embodiments of the invention. As shown in the graph 100 representative of the inter-arrival rates of packets by a UE 28, wherein the vertical axis corresponds to an arrival time and the horizontal axis corresponds to a number of packets, the UE 28 can receive a monitor bit in a packet header identified by the arrow 102. The received monitor bit indicates that the voice server 24 is requesting the UE 28 to monitor congestion and the UE 28 begins congestion monitoring, such as using the moving window process described herein to measure inter-arrival rates. As can be seen by the graph 100, during the time period 104 the UE 82 determines that the inter-arrival time/rate for a predetermined number of packets over a predetermined period of time (or windows) has continually exceeded a threshold value, indicating that there exists a consistent increase in the average arrival time/rate or inter-arrival time/rate. Accordingly, the UE 28 thereafter reports a congestion condition with a message to the voice server 24 as indicated by the arrow 106. This reporting is illustrated below in FIG. 7.

Figure 7:
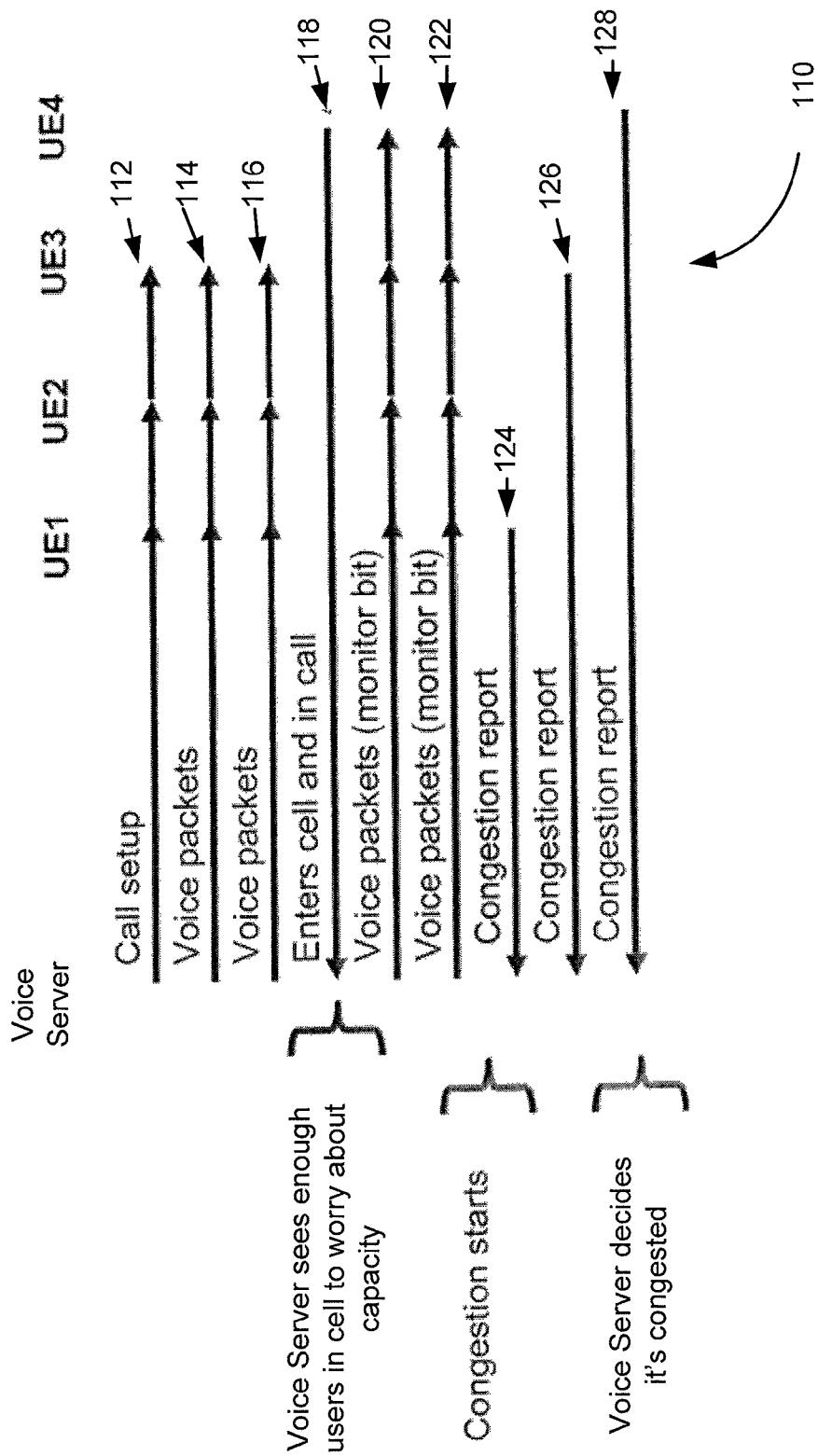
FIG. 7 is a flow diagram illustrating communication flows 110 in a cell for call setup, in accordance with an embodiments of the invention.

FIG. 7 is a flow diagram illustrating communication flows 110 in a cell for call setup, in accordance with an embodiments of the invention. As shown in FIG. 7, call setup communication flow begins at 112, for example, to initiate a group call to multiple users (e.g., UE1-UE4). Voice packets are communicated at 114 and 116 during a normal group call. The voice server 24 then determines that the number of UEs 28 in the cell has exceeded a predetermined value after another UE 28 enters at 118. However, the UE 28 is now in the same cell as the other UEs 28 on the group call. Thereafter, at 120 and 122, the voice server 24 sends a monitor bit in packets to the UEs 28 to initiate the congestion monitoring process by the UEs 28. In particular, at 120, the voice server 24 sends a monitor bit as a result of detecting a sufficient number of UEs 28 for generating enough information for voice server 24 to make an assessment regarding congestion. Thereafter, the UEs 28 determine whether a congestion condition exists, for example, using the moving window inter-arrival measurement process described herein. Any UE 28 that detects a congestion condition reports the condition to the voice server 24 at 124 and 126.

A congestion condition in the cell for which one or more actions are performed is not identified until a predetermined number of congestion reports are received by the voice server 24, or until other criteria are met. Accordingly, referring again to FIG. 7, thereafter another congestion repo11 is received at 128, which then exceeds a predetermined number of received congestion reports and the voice server 24 determines that a congestion condition exists in the cell. Other methods for detecting and determining whether a cell is congested can be provided. For example, the voice server 24 can receive congestion reports from the UEs 28 within the cell and decides whether or not the cell is congested based upon what percentage of UEs 28 reporting congestion. A list of incoming congestions reports, the time the reports were received and the source UE 28 of each can be stored. The reports can be maintained for a certain time period, for example defined by a Voting Window (VW). Thereafter, a certain percent or quorum of votes from the UEs 28 must be received during that window to identify that the congestion condition exists. If a Quorum High (QH) percent of UEs report congestion, then the cell is determined to be congested. If less than the low quorum (QL) percent of UEs 28 report congestion during the past VW, then no congestion is identified.

It should be note that the congestion status (congested/not congested) IS conveyed as detected, but in some embodiments only when the status changes. Additionally, reports from UEs 28 indicating bad radio conditions do not count toward the quorum.

When a determined congestion condition begins, a timer can be set. The timer can be used to determine whether the congestion condition has cleared, for example, by periodically determining congestion levels because as long as the cell is in a non-congested state, there are no events to indicate that the cell is non-congested.

Actions to reduce the congestion level are performed as described herein, for example, by dropping call legs. In particular, existing and requested call legs in a cell can be prioritized to determine whether to add, drop, deny or maintain the current number of call legs. A list of existing call legs ordered by priority can be maintained. A target number of legs (TL) also can be set. When a new request for adding or removing legs arrives from the main voice server 29, the legs are added or removed from the prioritized list. If the list is longer than TL, the list is truncated according to the TL value with new items above the truncation added, existing items below dropped and new items below denied or queued. If legs are added beyond a High Water (HW) mark (i.e., the most recent successful number of legs without congestion), a subsequent check for congestion can be performed. If there is no congestion, then the HW and TL values can be increased.

The various embodiments also can calculate the TL in the cell based upon a congestion state and recent capacity of the cell. In some embodiments, initially for each cell, HW=LH, where LH is the number of legs required to start monitoring congestion. Initially, TL=HW+1. When an indication of congestion is received, legs are dropped as described herein. Moreover, a new target number of legs are calculated as follows:

$$TL = currentLegs - ceiling(FR*currentLegs)$$

where FR=fraction of total legs to remove and if HW>L then HW=L−1.

When the cell is not congested, call legs are added, such that the desired target legs value is also increased. For example, TL is incremented by FA more call legs (FA=fraction of total to add) as follows:

Set $TL = ceiling(TL*(1+FA))$

Set HW=L

It should be noted that congestion reporting can be enabled and disabled based on the number of legs in the cell, for example, based on a high threshold level above which congestion reporting is enabled and a low threshold level below which congestion reporting is disabled. It further should be noted that when congestion monitoring is disabled, the HW value should be at least as high as LT, thus, HW is set to the maximum of HW and LH and TL=HW+1.

Thus, TL can generally define a desired number of call legs. In operation, when adding call legs to reach the TL level, if the number of current call legs is below the HW level, then new calls legs are added at a higher rate than when the number of current call legs is above the HW mark.

Moreover, the various embodiments of the invention constantly monitor congestion conditions, such as by checking the results at some time after a corrective action has been performed and determining whether further action is needed, for example, based on a value of the timer as described herein. However, the processes for detecting congestion and non-congestion can be different as shown in FIGS. 8 and 9.

Figure 8:
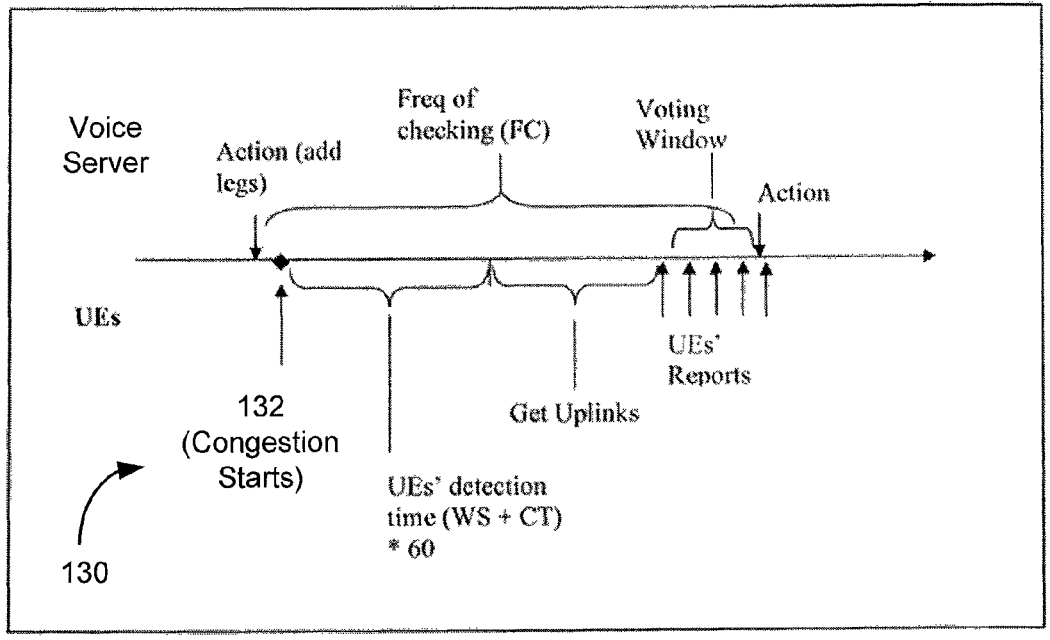
FIG. 8 is a timeline illustrating detection of a congestion condition in accordance with various embodiments of the invention.

For example, a timeline 130 illustrating the detection of congestion is shown in FIG. 8. The UEs 28 send reports when the running average for the inter-arrival packet time is above a threshold for a consecutive number of packets, such as, within a moving time window. The voice server waits for the time it would have taken for the UE 28 to receive an uplink, then when a determination is made that enough UEs 28 are reporting congestion during a predetermined time period, for example, the voting window as described herein, the voice server 24 determines that there was a congestion condition at the "congestion starts" time 132. It should be noted that there is a difference between "congestion starts" time and current time because events can have occurred during the time between the "congestion starts" time and the current time. Actions take into account any known changes since the "congestion gone" time, such as PTT calls ending or using historical data.

Thus, in operation, the various embodiments of the invention determine one or more actions to take based on congestion reports and current communication conditions. In particular, because of delays in the network and the time taken at a UE 28 to decide that a congestion condition is present, the congestion reports are delayed, thereby indicating that congestion occurred at some time period in the past (e.g., 3 seconds in the past). Thus, the congestion reports are used, as well as current conditions, for example, a current number of users in a communication cell versus the number of users in the communication cell at the time the congestion report was generated, to determine what, if any, actions should be taken. For example, a determination as to the number of call legs to drop can be based on the congestion report and the number of calls that have ended since the congestion report was generated.

Figure 9:
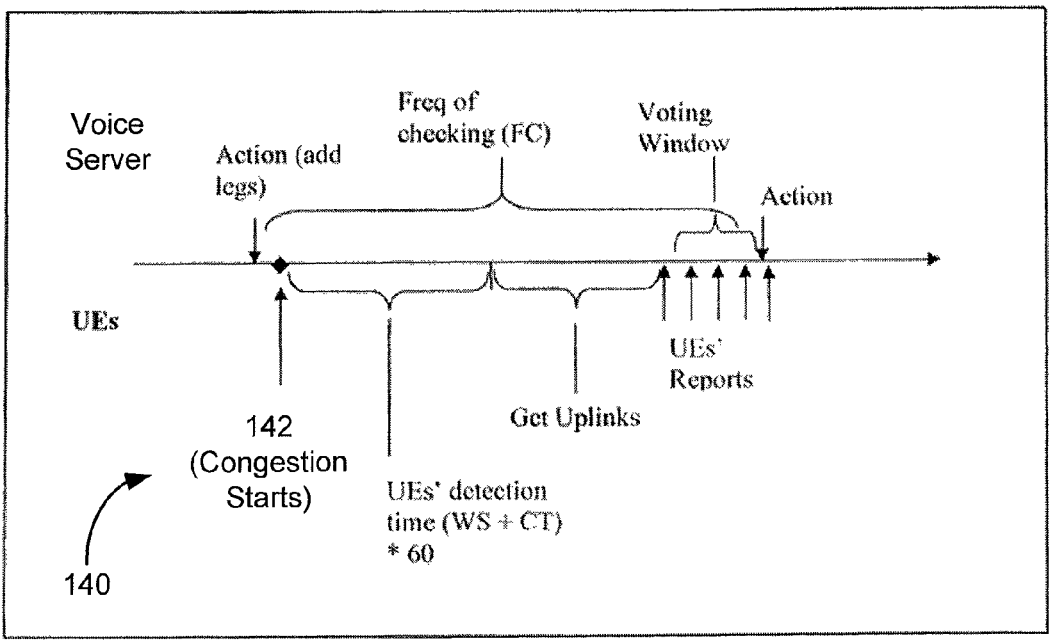
FIG. 9 is a timeline illustrating detection of a non-congestion condition in accordance with various embodiments of the invention.

A timeline 140 illustrating the detection of non-congestion is shown in FIG. 9. The UEs 28 stop sending reports as soon as the running average inter-arrival packet time drops below a threshold, which can take about 8-16 packets. Then, the voice server 24 waits for the time it would have taken for the UE 28 to receive an uplink, notices that few UEs 28 (below a threshold value) are reporting congestion during the voting window, then determines that there was no congestion condition at the "congestion starts" time 142. It should be noted that there is a difference between the "congestions starts" time and current time because events can have occurred during the time between the "congestions starts" time and the current time. Actions take into account any known changes since the "congestion starts" time, such as PTT calls ending or using historical data.

It should be noted that although the various embodiments are described in connection with congestion management for downlink capacity, the various embodiments can be implemented in connection with congestion management for uplink capacity. However, in the various embodiments where congestion management is performed based on downlink capacity by measuring inter-packet arrival delays on the downlink, the uplink delay also can be taken into account. For example, the delay of packets at the server can be determined and the delay information included in packets communicated on the downlink to the users, such that the delay from the server can be subtracted or removed from the determined downlink delay.

Also, the UEs 28 can begin congestion monitoring and report congestion condition based not on a request from an voice server 24 or independently, but based on a current call condition. It also should be noted that the length of time for the window described herein can be increased or decreased. Also, it further should be noted that certain congestion reports can be disregarded, for example, if the congestion reports are in data packets having packet sequence numbers pre-dating a previous action taken by the voice server 24.

Figure 10:
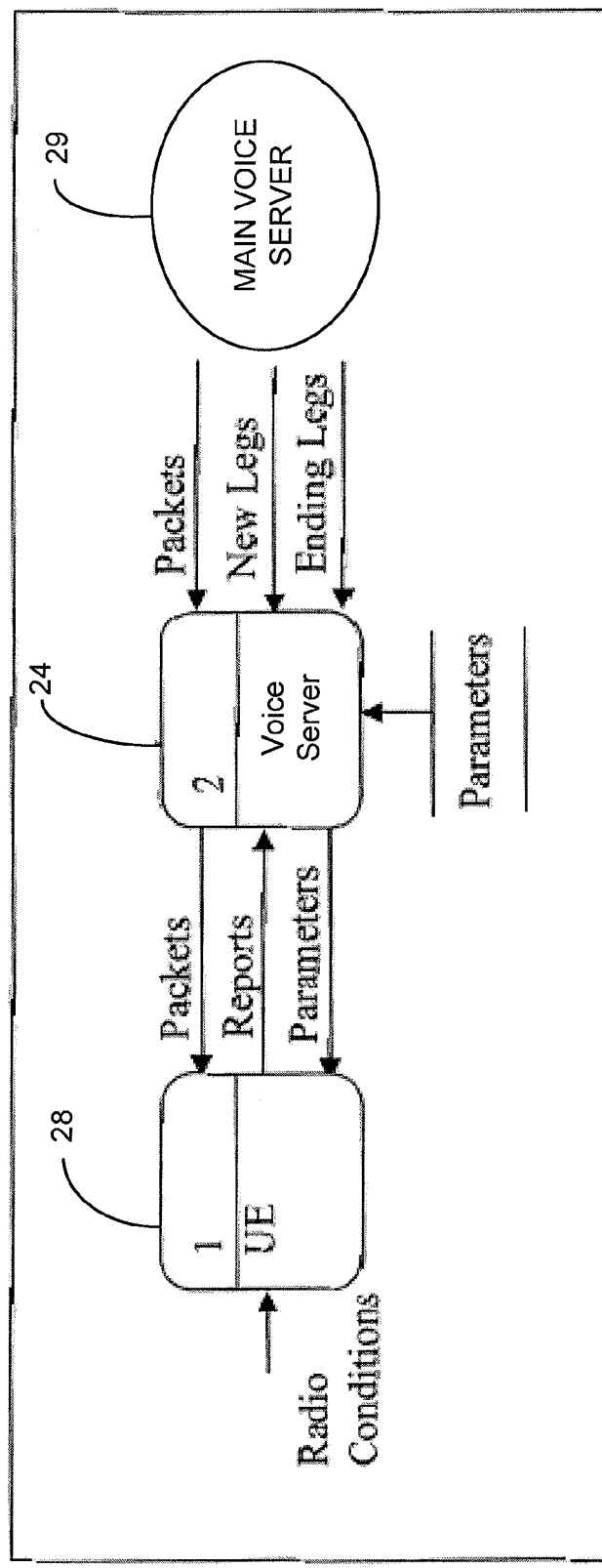
FIG. 10 is a block diagram illustrating user equipment data flow to detect congested conditions in accordance with various embodiments of the invention.

Thus, a method of detecting congestion at a communication cell level and for freeing capacity dynamically based upon current congestion information, historical network information and/or user behavior is provided as shown in FIG. 10 wherein the voice server 24 uses parameters to control the number of call legs based on reports from one or more UEs 28 as controlled by the main voice server 29. Service based upon service priority also can be degraded. Also, the various embodiments can ensure that all group call members obtain voice packets with minimum delay. Thus, based upon the particular users within a particular communication cell and the behavior of individual users or groups of users, which can be the current behavior or past behavior of a particular user or group of users, future use can be predicted and adjustments can be made accordingly. Accordingly, packet transfer congestion can be detected and used to manage airtime usage.

Modifications and variations to the various embodiments are contemplated. For example, a visualization tool or user interface, such as a graphical user interface can be provided to allow a user to view congestion reports, etc. to determine if congestion exists or is likely to exist, such as by recognizing patterns in the congestion data.

The various embodiments or components, for example, the cellular communication system or controllers therein, can be implemented as part of one or more computer systems. The computer system can include a computer, an input device, a display unit and an interface, for example, for accessing the Internet. The computer can include a microprocessor. The microprocessor can be connected to a communication bus. The computer can also include a memory. The memory can include Random Access Memory (RAM) and Read Only Memory (ROM). The computer system further can include a storage device, which can be a hard disk drive or a removable storage drive such as a floppy disk drive, optical disk drive, and the like. The storage device can also be other similar means for loading computer programs or other instructions into the computer system.

As used herein, the term "computer" can include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements can also store data or other information as desired or needed. The storage element can be in the form of an information source or a physical memory element within the processing machine.

The set of instructions can include various commands that instruct the computer as a processing machine to perform specific operations such as the methods and processes of the various embodiments of the invention. The set of instructions can be in the form of a software program. The software can be in various forms such as system software or application software. Further, the software can be in the form of a collection of separate programs, a program module within a larger program or a portion of a program module. The software also can include modular programming in the form of object-oriented programming. The processing of input data by the processing machine can be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for detecting a congestion condition in a communication cell of a communication system, the method comprising:
measuring an inter-arrival time for a plurality of communication packets in at least one user equipment within the communication cell, the inter-arrival time defining a delay between arrivals of the communication packets at the user equipment;
calculating an average value for a number of consecutive samples of the inter-arrival time;
determining the average value over each of a plurality of time periods; and
identifying a congestion condition when the average values exceed a predetermined value.

2. A method in accordance with claim 1, wherein the average value comprises a running average.

3. A method in accordance with claim 1, further comprising determining a plurality of average values for a plurality of measurements over the plurality of time periods.

4. A method in accordance with claim 1, wherein the plurality of time periods are defined by a plurality of consecutive time windows.

5. A method in accordance with claim 1, wherein the plurality of time periods are defined by a plurality of consecutive measurements.

6. A method in accordance with claim 1, wherein the average value is determined a plurality of times with each determination separated by a time period.

7. A method in accordance with claim 1, further comprising changing the predetermined value based on system conditions.

8. A method in accordance with claim 7, wherein the system conditions comprise a traffic level within the communication cell.

9. A method in accordance with claim 1, further comprising weighting the average value for each of the plurality of time periods.

10. A method in accordance with claim 1, further comprising discarding a calculated average value for inter-arrival times that exceeds a threshold when identifying the congestion condition if the threshold is exceeded less than a predetermined number of times.

11. A method for controlling congestion within a communication cell of a communication system, the method comprising:
requesting a plurality of user equipment within the communication cell to monitor congestion;
receiving from the plurality of user equipment a report of a congestion condition when a plurality of average inter-arrival times values determined over each of a plurality of time periods exceed a threshold value, each said average inter-arrival time calculated for a number of consecutive samples of an inter-arrival time, and the inter-arrival time defining a delay between arrivals off communication packets received by the user equipment; and
controlling congestion with the communication cell based on a received number of congestion reports.

12. A method in accordance with claim 11, further comprising transmitting a monitor bit in a packet header to the plurality of user equipment to initiate the request to monitor congestion.

13. A method in accordance with claim 11, further comprising determining a number of user equipment within the communication cell and wherein the requesting is performed after a determined number of user equipment in the communication cell has exceeded a predetermined value.

14. A method in accordance with claim 11, wherein controlling the congestion comprises at least one of denying new connections in the communication cell and dropping existing connections in the communication cell.

15. A method in accordance with claim 11, further comprising setting a timer when the received number of congestion reports exceeds a predetermined value indicating a congestion condition.

16. A method in accordance with claim 11, wherein controlling the congestion comprises adjusting a rate at which new connections are added in the communication cell based on a difference between a current number of connections and a desired number of connections.

17. A method in accordance with claim 11, further comprising determining a past action for controlling the congestion and performing a new action to control congestion based on the past action and the received congestion reports.

18. A method in accordance with claim 11, further comprising determining current communication conditions in the communication cell and wherein controlling the congestion is based on the current communication conditions and the received congestion reports.

19. A method in accordance with claim 11, further comprising determining an uplink delay at a server of the communication cell and subtracting the uplink delay from the downlink delay determined from the inter-arrival times.

20. A wireless communication system, comprising:
a plurality of communication cells;
a plurality of user equipment configured to identify a congestion condition when at least one average inter-arrival time exceeds a threshold value, the average inter-arrival time calculated for a number of consecutive samples of an inter-arrival time, the inter-arrival time defining a delay between arrivals of communication packets at the user equipment; and
a plurality of voice servers, each having one of the plurality of communication cells assigned thereto and wherein at least one of the plurality of voice servers is configured to control congestion within at least one communication cell based on congestion reports received from said plurality of user equipment, the congestion reports indicating said congestion condition.

21. A method for capacity management in a communication system, the method comprising:
communicating a plurality of congestion reports from a plurality of first network nodes within a communication cell of the communication system to a second network node in said communication cell, each of said plurality of congestion reports comprising information specifying a user communication activity;
predicting, by the second network node, behaviors of users of said plurality of first network nodes based on contents of said congestion reports;
estimating, by the second network node, a level of congestion within the communication cell of the communication system based on said predicted behaviors; and
adjusting communication links within the communication cell based on the level of congestion;
wherein each of the plurality of congestion reports is communicated when a congestion condition is identified by a respective node of the plurality of first network nodes, the congestion condition identified when average inter-arrival time values determined for a plurality of time periods exceed a threshold value, each average inter-arrival time value calculated for a number of consecutive samples of an inter-arrival time, the inter-arrival time defining a delay between arrivals of communication packets at the respective node.

* * * * *